United States Patent
Watanabe et al.

(10) Patent No.: US 6,889,719 B2
(45) Date of Patent: May 10, 2005

(54) PLASTIC PIPE AND MANUFACTURING METHOD THEREFOR

(75) Inventors: Norio Watanabe, Aichi-ken (JP); Kenichi Mitsui, Aichi-ken (JP)

(73) Assignee: Toyoda Gosei, Co., Ltd., Aichi-ken (JP)

( * ) Notice: Subject to any disclaimer, the term of this patent is extended or adjusted under 35 U.S.C. 154(b) by 329 days.

(21) Appl. No.: 10/188,114

(22) Filed: Jul. 3, 2002

(65) Prior Publication Data

US 2003/0005973 A1 Jan. 9, 2003

(30) Foreign Application Priority Data

Jul. 6, 2001 (JP) ........................................ 2001-206442

(51) Int. Cl.[7] .............................................. F16L 11/00
(52) U.S. Cl. ...................................... 138/137; 138/141
(58) Field of Search ................................ 138/137, 141; 428/36.91

(56) References Cited

U.S. PATENT DOCUMENTS

| | | | | | |
|---|---|---|---|---|---|
| 3,561,493 | A | * | 2/1971 | Maillard et al. | 138/141 |
| 5,004,782 | A | * | 4/1991 | Mashita et al. | 525/64 |
| 5,560,398 | A | * | 10/1996 | Pfleger | 138/121 |
| 5,588,468 | A | * | 12/1996 | Pfleger | 138/121 |
| 5,792,532 | A | * | 8/1998 | Pfleger | 428/36.9 |
| 6,118,968 | A | * | 9/2000 | Schlueter et al. | 399/333 |
| 6,446,673 | B1 | * | 9/2002 | Iio et al. | 138/137 |
| 6,476,158 | B1 | * | 11/2002 | England et al. | 525/466 |
| 6,485,806 | B1 | * | 11/2002 | Tateyama et al. | 428/36.9 |
| 6,514,611 | B1 | * | 2/2003 | Shepherd et al. | 428/373 |
| 6,604,551 | B2 | * | 8/2003 | Nishi et al. | 138/137 |
| 6,608,136 | B1 | * | 8/2003 | Dean et al. | 524/505 |
| 6,613,714 | B2 | * | 9/2003 | Grosch et al. | 502/175 |

FOREIGN PATENT DOCUMENTS

JP          11-300844          11/1999

* cited by examiner

Primary Examiner—James Hook
(74) Attorney, Agent, or Firm—Posz & Bethards, PLC

(57) ABSTRACT

A plastic pipe 10 is a pipe utilized in a cooling water systems, and the bonding strength of each layer is heightened, and resistance capabilities of the antifreeze solution are enhanced. The plastic pipe 10 comprises an inner layer 22 formed from either a polyphenylene sulfide or an aromatic polysulfide, which is a denatured substance thereof, an intermediate layer 24, which is a mixture of PPS resin and a polyamide resin, and an outer layer 26 including a polyamide resin. The inner layer 22 is formed such that permeation of an antifreeze, which has mainly ethylene glycol, is less than 3.0 g/m$^2$ per day. The resistance capabilities of the antifreeze solution can be achieved by making the thickness of the inner layer 22 0.2 mm or greater.

7 Claims, 4 Drawing Sheets

PLASTIC PIPE AND MANUFACTURING METHOD THEREFOR

This application claims the benefit of and priority from Japanese Application No. 2001-206442 filed Jul. 6, 2001, the content of which is incorporated herein by reference.

BACKGROUND OF THE INVENTION

1. Field of the Invention

The present invention relates to a multi-layer plastic pipe for use in a cooling water system, and a manufacturing method therefor.

2. Description of the Related Art

The conventional technology of a plastic pipe is disclosed in JP No. 11-300844A. The plastic pipe is constituted by laminating an outer layer comprising a polyamide resin to an inner layer. A resin material of the inner layer is made of a PPS resin including a polyphenylene sulfide or an denatured aromatic polysulfide resin, and a polyamide resin (nylon 6 or the like). In this plastic pipe, resistance to an antifreeze solution, which has ethylene glycol as its main constituent, is exhibited by the PPS resin in the inner layer, and adhesiveness relative to the outer layer is heightened by adding a polyamide resin to the inner layer.

However, the conventional plastic pipe does not achieve sufficient durability relative to resistance capabilities of the antifreeze solution while ensuring adhesiveness between the inner layer and outer layer.

SUMMARY OF THE INVENTION

An object of the present invention is to provide a plastic pipe, which increases the bonding strength of each layer, and heightens resistance capabilities of an antifreeze solution, for liquid containing antifreeze solution and a manufacturing method therefor.

To solve this problem, an exemplary first embodiment of the present invention provides a multi-layer plastic pipe for use in a cooling water system. The multi-layer plastic pipe comprises an inner layer made of a first resin material, an intermediate layer of a second resin material and outer layer made of a third resin material. The first resin material has a PPS resin selected from a group of a polyphenylene sulfide and a denatured aromatic polysulfide resin. The second resin material is a mixture of the PPS resin and a polyamide resin. The third resin material includes a polyamide resin. The inner layer is formed such that permeation of an antifreeze solution having ethylene glycol as a main constituent becomes less than 3.0 $g/m^2$ per day.

The plastic pipe related to the present invention has a three-layer structure comprising an inner layer, an intermediate layer and an outer layer, and is utilized in the cooling water system. Since the outer layer is formed from a polyamide resin, it features outstanding mechanical strength and bendability. Since the inner layer is formed from a first resin material having the PPS resin, and moreover, is formed such that the permeation of an antifreeze solution having ethylene glycol as its main constituent is less than 3.0 $g/m^2$ per day, the inner layer serves as a barrier layer for the intermediate layer and outer layer, not-allowing the antifreeze solution to permeate to the outer layer from the intermediate layer.

Further, the intermediate layer serves as an adhesive layer between the inner layer and the outer layer. That is, because a second resin material, which forms the intermediate layer, intermixes the PPS resin with a polyamide resin, the inner layer and the intermediate layer bond together in the proximity of the boundary face due to the fusion of the PPS resins in the two layers. Further, the intermediate layer and the outer layer bond together in the proximity of the boundary face due to the fusion of the polyamide resins in the two layers.

Accordingly, there is no deterioration of the outer layer by the antifreeze solution thanks to the barrier action of the inner layer. Furthermore, because the bonding strength at the boundary face of each layer is increased by the fusion of the resin materials comprising each layer, and there is no separation, the multi-layer plastic pipe of the present invention can ideally be used in the cooling water system of automobiles and the like.

As one means of making the amount of antifreeze solution that permeates the inner layer less than 3.0 $g/m^2$ per day, a constitution, which makes the thickness of the inner layer 0.2 mm or more, can be employed. Since the resistance capabilities of the antifreeze solution of the PPS resin increase dramatically at a thickness of greater than 0.2 mm, by making the thickness of the inner layer greater than this, it is possible to keep permeation lower than the amount mentioned hereinabove.

The first resin material, which constitutes the inner layer, can have a composition, which, besides the PPS resin, contains 20 to 40 percent by weight of a softening material selected from a group of ethylene-gylcidyl methacrylate and ethylene-propylene copolymers. A softening material is desirable for enabling the enhancement of the low-temperature impact capabilities and extrusion moldability of the inner layer.

The second resin material, which constitutes the intermediate layers, can have a composition, which contains 10 to 30 percent by weight of a softening material selected from a group of ethylene-gylcidyl methacrylate and ethylene-propylene copolymers. The softening material of the intermediate layer serves to further increase adhesive strength by fusing with the softening material of the inner layer.

Furthermore, the second resin material may have a wt % ratio of the PPS resin to polyamide resin in a range of 90:10 to 55:45. The reason the PPS resin is made richer than the polyamide resin here is as follows. Since the outer layer is formed from a single polyamide resin, even a reduced amount of polyamide resin in the intermediate layer does not significantly impact the bonding strength of the outer layer and the intermediate layer. However, when the inner layer is composed of a mixture of the PPS resin and the softening material, the amount of the PPS resin comprising the inner layer becomes relatively smaller as the amount of the softening material increases. Accordingly, to ensure the bonding strength between the intermediate layer and the inner layer, it is desirable to make the amount of the PPS resin in the intermediate layer larger than the amount of polyamide resin.

Further, another invention is a method for manufacturing plastic pipe, and is characterized in that the inner layer, the intermediate layer and the outer layer are formed by extruding the first resin material, the second resin material and the third resin material practically simultaneously such that they are laminated annularly. According to this manufacturing method, it is possible to ideally manufacture a plastic pipe in which the respective layers have high adhesion strength.

DESCRIPTION OF THE PREFERRED EMBODIMENTS

Figure 1:
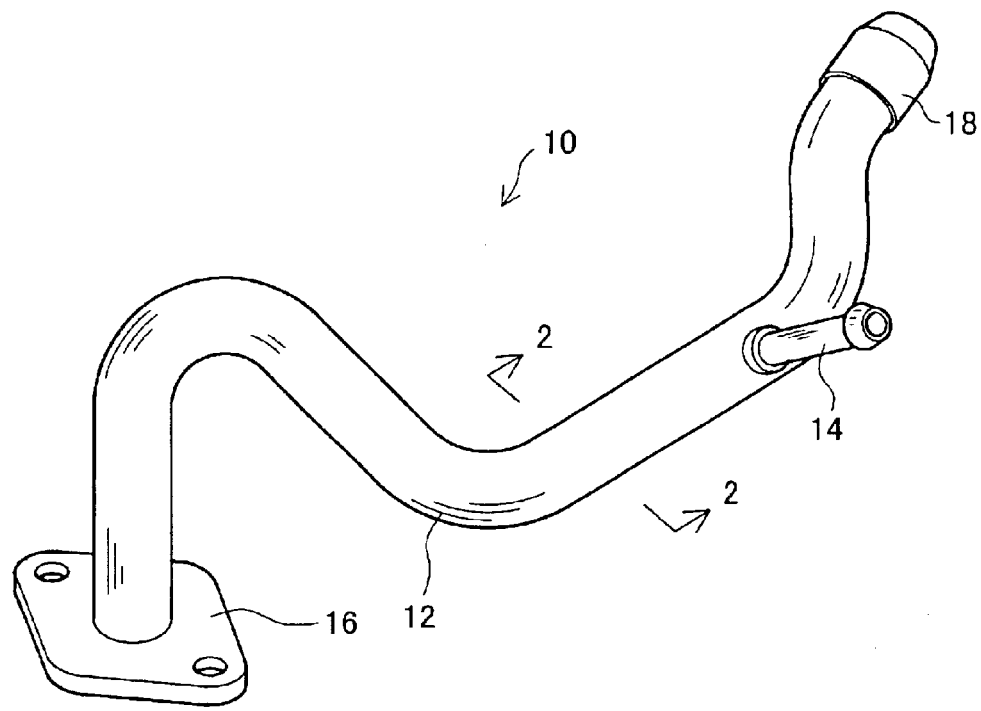
FIG. 1 is a simplified oblique view of a plastic pipe of an embodiment.
Figure 2:
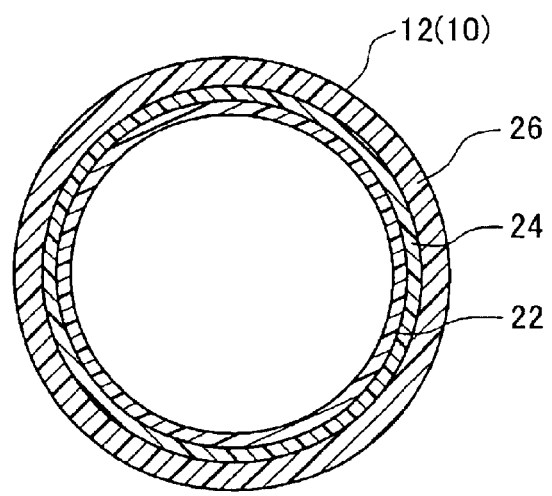
FIG. 2 is a cross-sectional view of the plastic pipe along line 2—2 of FIG. 1.

FIG. 1 is a simplified oblique view of a plastic pipe 10 of an embodiment, and FIG. 2 is a cross-sectional view of the plastic pipe 10 along line 2—2 of FIG. 1 The plastic pipe 10 is utilized in she cooling water system of an automobile engine, that is, in the circulatory ducts for an antifreeze solution, which has ethylene glycol as a main constituent, and has the following constitution.

As shown in FIG. 1, the plastic pipe 10 has a main pipe 12 formed in a three-dimensional curve, a branch pipe 14 for establishing a branch from the main pipe 12, and end fittings 16, 18 at both ends of the main pipe 12. The main pipe 12, as shown in FIG. 2, is a plastic pipe, which is formed for pressure resistance of over 2 MPa and bendability, has an inner diameter of between 15.3 and 15.9 mm, a thickness of between 1.7 and 2.3 mm, and laminates an inner layer 22, an intermediate layer 24, and an outer layer 26. The constitution of each layer will be explained hereinbelow.

(1) Inner Layer 22

The inner layer 22 is a barrier layer for providing resistance capabilities of the antifreeze solution, and is made of a first resin material, which intermixes a PPS resin and a softening material. The PPS resin is selected from a group of a polyphenylene sulfide and a denatured aromatic polysulfide resin. The PPS resin is principally for providing resistance capabilities of the antifreeze solution. The softening material is added to improve low-temperature impact capabilities as well as extrusion moldability, and, for example, can comprise ethylene-gylcidyl methacrylate and ethylene-propylene copolymers.

The percentage composition of the first resin material, for example, is mixed at 73 wt % of the PPS resin to 27 wt % of the softening material. In this composition ratio, the softening material may be prepared with 100 parts by weight of the PPS resin, 5 parts by weight of ethylene-gylcidyl methacrylate and 15 parts by weight of ethylene-propylene copolymer.

It is desirable for the thickness of the inner layer 22 to be between 0.2 and 0.6 mm in the case of the inner diameter and wall thickness of the above-mentioned main pipe 12. This is because adequate resistance capabilities of the antifreeze solution are not achieved when the thickness of the inner layer 22 is less than 0.2 mm. In other words, this is because, when the resistance capabilities of the antifreeze solution required for the automobile cooling water system is 3.0 g/m$^2$ per day, a greater thickness than 0.2 mm is needed. Conversely, it is desirable that the thickness of the inner layer 22 not exceed 0.6 mm so as not to lower impact resistance and extrusion capabilities. Furthermore, the relationship between the thickness of the inner layer 22 and resistance capabilities of the antifreeze solution will be explained hereinbelow based on test data.

(2) Intermediate Layer 24

The intermediate layer 24 is an adhesive layer for bonding the inner layer 22 and the outer layer 26, and is formed from a second resin material, which intermixes PPS resin and polyamide resin, and also intermixes a softening material. As the polyamide resin, nylon 6, nylon 11, nylon 12 and so forth may be used.

The PPS resin and softening material constituting the second resin material are compounded so as to provide the inner layer 22 with adhesive capabilities, and can use the same resin materials as the PPS resin and softening material of the first resin material. Polyamide resin is compounded to provide adhesive capabilities to the outer layer 26.

The percentage composition of the second resin material, for example, can be prepared such that PPS resin accounts for 58 wt %, polyamide resin accounts for 21 wt %, and a softening material of the same composition as that of the first resin material accounts for 21 wt %. Therefore, the second resin material makes composition-rich PPS resin the base material, and includes dispersed polyamide resin and softening material.

It is desirable that the thickness of the intermediate layer 24 be between 0.05 and 0.6 mm in the case of the inner diameter and wall thickness of the above-mentioned main-pipe 12. This is because adequate adhesive capabilities are not achieved when the thickness of the intermediate layer 24 is less than 0.05 mm. On the other hand, it is because when the thickness of the intermediate layer 24 exceeds 0.6 mm, the thickness of the intermediate layer 24 relative to the thickness of the main pipe 12 becomes greater, making it impossible to ensure thicknesses that enable the desired characteristics to be achieved in the inner layer 22 and the outer layer 26.

(3) Outer Layer 26

The outer layer 26 is a layer for providing pressure resistance and mechanical strength, and is formed from a third resin material, which is a polyamide resin. As the polyamide resin, nylon 6, nylon 11, nylon 12 and so forth may be used. The thickness of the outer layer 26 is determined by taking mechanical strength into account.

Figure 3:
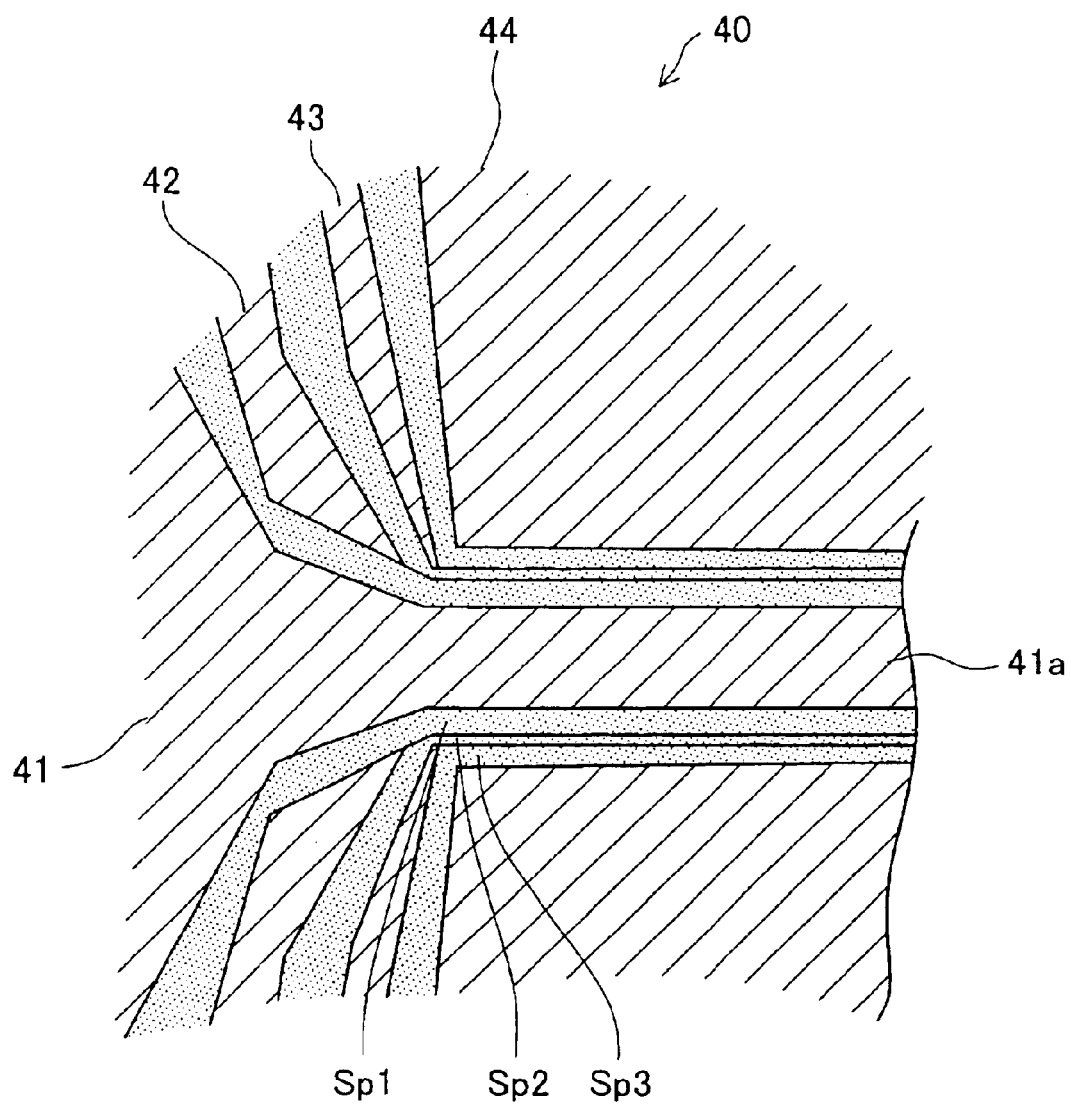
FIG. 3 is a cross-sectional view schematically showing a principal portion of an extruder.

Next, a manufacturing method for the plastic pipe 10 will be explained. FIG. 3 is a cross-sectional view schematically showing a principal portion of a multi-layer extruder. The extruder comprises a die head mechanism 40 for forming multiple plastic layers. The die head mechanism 40 comprises a first head 41 having a mandrel 41a in the center, a second head 42, a third head 43 and a fourth head 44, arranged in a concentric circle. A first extruding space Sp1 for the inner layer 22 is formed between the first head 41 and the second head 42, a second extruding space Sp2 for the intermediate layer 24 is formed between the second head 42 and the third head 43, and a third extruding space Sp3 for the outer layer 26 is formed between the third head 43 and the fourth head 44.

The multi-layer extruder performs co-extrusion, by which the first resin material, the second resin material and the third resin material are extruded simultaneously from the first extruding space Sp1, the second extruding space Sp2 and the third extruding space Sp3, respectively. When the first through the third resin material co-extruded through the first through the third extruding spaces Sp1 to Sp3 and cool down, the three-layer main pipe 12 constituting the inner layer 22, the intermediate layer 24, and the outer layer 26, respectively, is formed.

Figure 4:
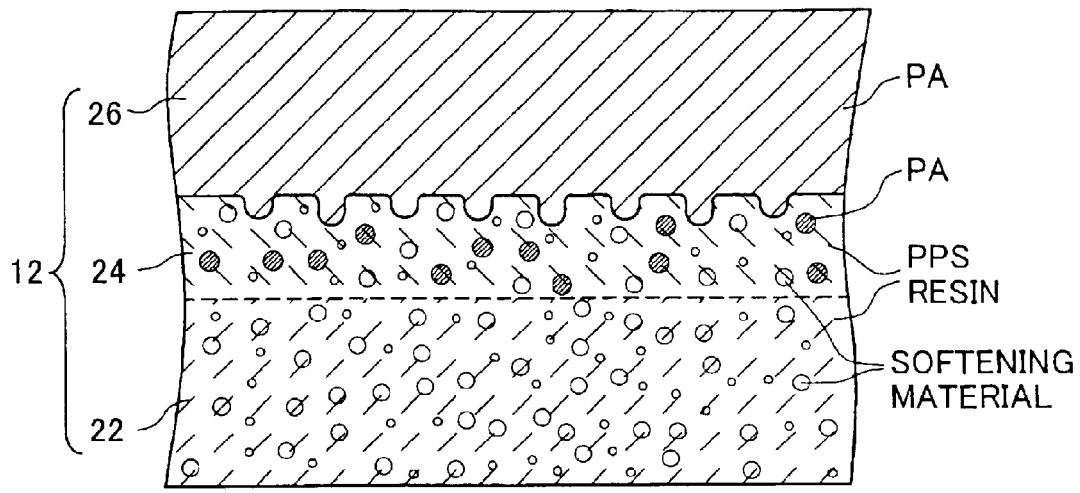
FIG. 4 is a schematic view schematically showing the states of adhesion between an inner layer, intermediate layer and outer layer.

In the main pipe 12 produced in this manner, as will be explained hereinbelow, the respective layers bond with one another by the first through the third resin materials respectively cooling and hardening. FIG. 4 is a schematic view schematically showing the respective states of adhesion of the inner layer 22, the intermediate layer 24, and the outer layer 26.

(1) Bonding Mechanism Between Inner Layer 22 and Intermediate Layer 24

The inner layer 22 is in a state, wherein, being rich in PPS resin, PPS resin constitutes the base material, and the softening material is mixed therein, and a portion of the PPS resin is exposed to the boundary face of the intermediate layer 24. Conversely, the intermediate layer 24 is in a state, wherein, being rich in PPS resin, PPS resin constitutes the base material, and polyamide resin is mixed therein, and a portion of this PPS resin is exposed to the boundary face of the inner layer 22. Thus, at the bonding surface (boundary face) of the inner layer 22 and intermediate layer 24, the molten PPS resin of the inner layer 22 fuses with the molten PPS resin of the intermediate layer 24, and in this state, the resins harden and unite. Accordingly, the inner layer 22 and the intermediate layer 24 are strongly bonded by the PPS resins comprising the inner layer 22 and the intermediate layer 24.

(2) Bonding Mechanism Between Intermediate Layer 24 and Outer Layer 26

The intermediate layer 24 is in a state, wherein, being rich in PPS resin, PPS resin constitutes the base material, and polyamide resin is mixed therein, and a portion of the polyamide resin exists in the boundary face of the outer layer 26. Conversely, the outer layer 26 is a single-phase polyamide resin. Thus, at the bonding surface (boundary face) of the intermediate layer 24 and the outer layer 26, the molten polyamide resin of the outer layer 26 fuses with the molten polyamide resin of the intermediate layer 24, and the resins harden and unite. Accordingly, an anchoring effect occurs, and the intermediate layer 24 and the outer layer 26 are strongly bonded by the polyamide resins comprising the intermediate layer 24 and the outer layer 26.

Therefore, according to the multi-layer extruder, there is produced the main pipe 12, in which the inner layer 22, the intermediate layer 24 and the outer layer 26 are strongly bonded.

The straight main pipe 12 produced in this manner is subjected to bending. The main pipe 12 is immersed for between approximately 3 and 10 minutes inside a vessel in which the temperature is maintained at between approximately 150 and 215° C., and thereafter, the main pipe 12 is set in a three-dimensional bending template not shown in the figure, and then cooled to room temperature. In accordance therewith, the main pipe 12 of the curved shape shown in FIG. 1 is produced. Furthermore, forming a through-hole in the main pipe 12, connecting the branch pipe 14, and, in addition, inserting and fastening the end fittings 16, 18 in a heated state of the main pipe 12, produces the plastic pipe 10.

Next, the resistance capabilities of the antifreeze solution of the plastic pipe 10 will be explained.

(1) Durability Testing

Figure 5:
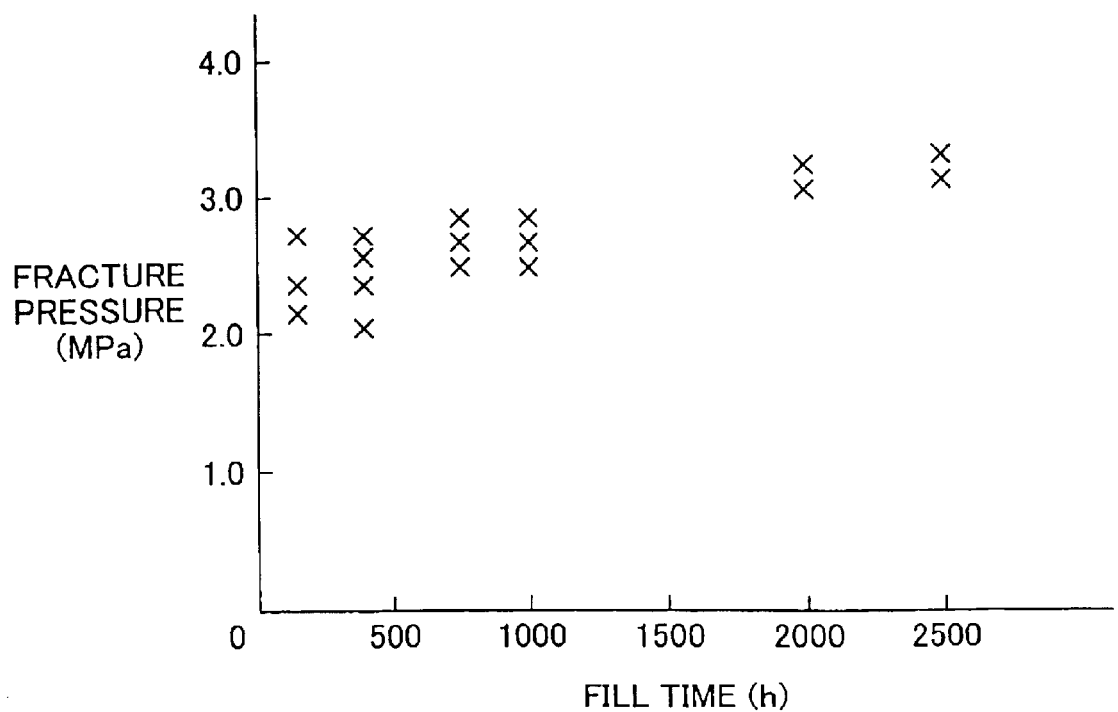
FIG. 5 shows the durability to resistance capabilities of the antifreeze solution of plastic pipes.

FIG. 5 shows the results of measuring resistance capabilities of the antifreeze solution when the thicknesses of the inner layer 22, the intermediate layer 24, and the outer layer 26 of the plastic pipe 10 were 0.5 mm, 0.3 mm and 1.2 mm, respectively. That is, after filling the plastic pipe 10 with the antifreeze solution and exposing it to a hot air atmosphere of 120° C., bursting pressure (MPa) was measured at various times while the pipe was filled (fill time). As a result of this, a bursting pressure of greater than 2 MPa was achieved continuously until the fill time of the antifreeze solution reached 2,500 hours.

(2) Thickness of Inner Layer 22 and Antifreeze Solution Permeation Factor

Figure 6:
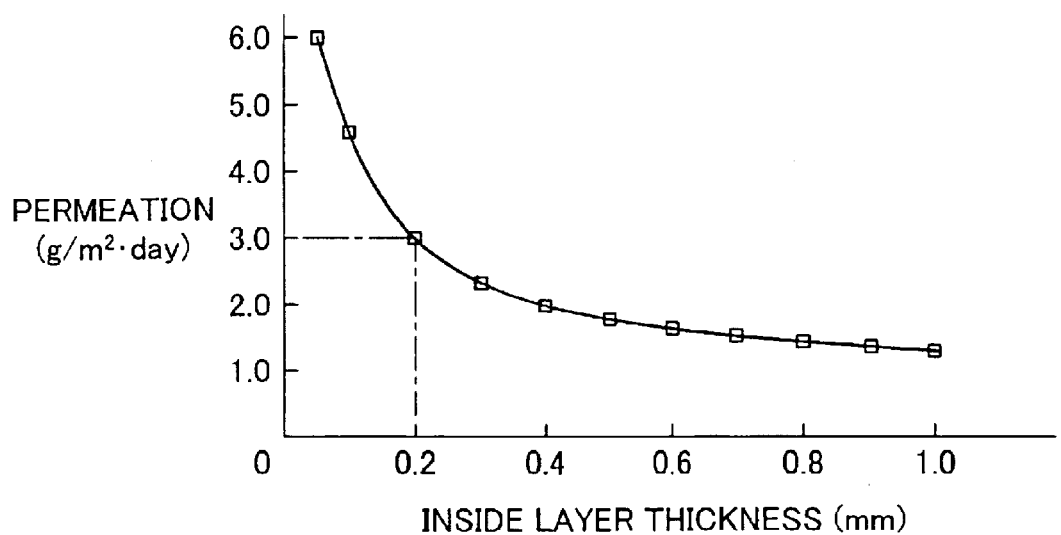
FIG. 6 shows the relationship between the thickness of the inner layer and antifreeze solution permeation.

FIG. 6 shows the relationship between the thickness of the inner layer and the antifreeze solution permeation. In FIG. 6, it is clear that when the thickness of the inner layer 22 is less than 0.2 mm, the antifreeze solution permeation increases drastically. For plastic pipe used in the cooling water systems of automobiles, taking into account the safety factor, it is desirable that the plastic pipe satisfy the condition of 3.0 $g/m^2$ per day, and it is clear that the condition can be met at a thickness of 0.2 mm or more.

(3) Impact Testing

Figure 7:
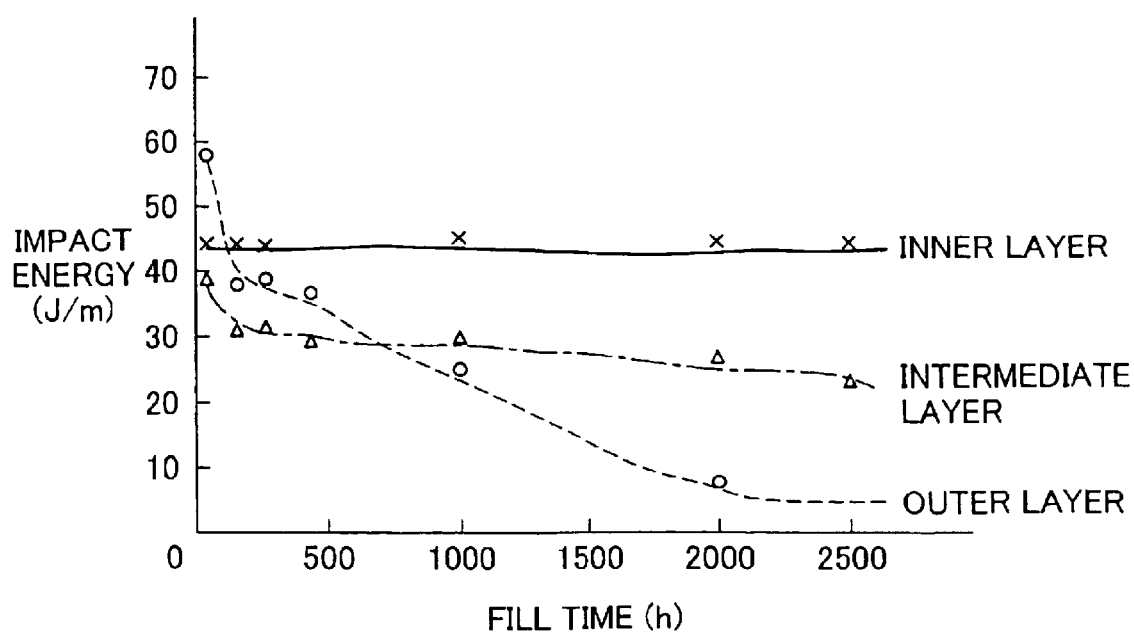
FIG. 7 shows the results of Izod impact tests on antifreeze solution-filled specimens of the respective layers constituting the plastic pipe.

FIG. 7 shows the results when pipes corresponding to the inner layer 22, the intermediate layer 24, and the outer layer 26, respectively were manufactured in single phase, and Izod impact testing was performed after the pipes had been filled with the antifreeze solution for predetermined periods of time. Here, Izod impact testing refers to a test method in which impact energy is measured when a notched specimen is stroked and broken at the vicinity of the notch by a hammer or the like. During testing, the thickness of the inner layer 22 was set at 0.5 mm, the thickness of the intermediate layer 24 was 0.3 mm, and the thickness of the outer layer 26 was 1.2 mm, the specimens were filled with the antifreeze solution in a 120° C. environment, and impact energy was measured at various fill times.

The results of the testing clearly showed that exposing the intermediate layer 24 and the outer layer 26 to the antifreeze solution resulted in reduced impact energy resistance and degradation, but that even when the inner layer 22 is exposed to the antifreeze solution, the impact energy resistance of inner layer 22 did not decline, and the inner layer 22 showed no signs of degradation. That is, when the thickness of the inner layer 22 is set at 0.5 mm or more, it is clear that the inner layer 22 serves as a barrier layer, and prevents the degradation of intermediate layer 24 and outer layer 26.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A multi-layer plastic pipe for liquid containing antifreeze solution, the multi-layer plastic pipe comprising:
    an inner layer made of a first resin material, the first resin material having a PPS resin selected from a group of a polyphenylene sulfide and a denatured aromatic polysulfide resin;
    an intermediate layer made of a second resin material, the second resin material being a mixture of the PPS resin and a polyamide resin; and
    an outer layer made of a third resin material including a polyamide resin, wherein:
        the inner layer is formed such that permeation of the antifreeze solution having mainly ethylene glycol becomes less than 3.0 $g/m^2$ per day;
        the first resin material contains 20 to 40 wt % of a softening material including ethylene-gylcidyl methacrylate and ethylene-propylene copolymers; and the second resin material contains 10 to 30 wt % of a softening material including ethylene-gylcidyl methacrylate and ethylene-propylene copolymers.

2. The plastic pipe according to claim 1, wherein a thickness of the inner layer is 0.2 mm or more.

3. The plastic pipe according to claim 1, wherein the second resin material has a wt % ratio of the PPS resin to polyamide resin in a range of 90:10 to 55:45.

4. The plastic pipe according to claim 3, wherein a thickness of the inner layer is 0.2 mm or more.

5. A method for manufacturing a multi-layer plastic pipe for liquid containing antifreeze solution, the method comprising:

preparing (i) a first resin material having a PPS resin selected from a group of a polyphenylene sulfide and a denatured aromatic polysulfide resin, (ii) a second resin material being a mixture of the PPS resin and a polyamide resin; and (iii) a third resin material including a polyamide resin, and extruding a first resin material, a second resin material and a third resin material such that an inner layer, an intermediate layer and an outer layer are laminated annularly to make the multi-layer plastic pipe, wherein:

the inner layer is formed such that permeation of an antifreeze solution having mainly ethylene glycol becomes less than 3.0 $g/m^2$ per day;

the first resin material contains 20 to 40 wt % of a softening material including ethylene-gylcidyl methacrylate and ethylene-propylene copolymers; and the second resin material contains 10 to 30 wt % of a softening material including ethylene-gylcidyl methacrylate and ethylene-propylene copolymers.

6. The method according to claim 5, wherein a thickness of the inner layer is 0.2 mm or more.

7. The method according to claim 5, wherein the second resin material has a wt % ratio of the PPS resin to polyamide resin in a range of 90:10 to 55:45.

* * * * *